United States Patent [19]

Pfeifer

[11] 4,250,386
[45] * Feb. 10, 1981

[54] X-RAY DIAGNOSTIC INSTALLATION FOR X-RAY PHOTOGRAPHS

[75] Inventor: Rolf Pfeifer, Erlangen, Fed. Rep. of Germany

[73] Assignee: Siemens Aktiengesellschaft, Berlin & Munich, Fed. Rep. of Germany

[*] Notice: The portion of the term of this patent subsequent to Jan. 30, 1996, has been disclaimed.

[21] Appl. No.: 942,124

[22] Filed: Sep. 13, 1978

[30] Foreign Application Priority Data

Oct. 24, 1977 [DE] Fed. Rep. of Germany ....... 2747659

[51] Int. Cl.³ ............................................. G03B 41/16
[52] U.S. Cl. ..................................... 250/402; 250/413
[58] Field of Search ............... 250/401, 402, 408, 409, 250/413, 416 R, 320, 322

[56] References Cited

U.S. PATENT DOCUMENTS 4,137,571  1/1979  Pfeifer ............................ 250/416 R Primary Examiner—Craig E. Church
Attorney, Agent, or Firm—Hill, Van Santen, Steadman, Chiara & Simpson

[57] ABSTRACT

The program control device contains an electronic read-only memory for each photographic program, whose input is connected to a resettable pulse counter which is actuated step-by-step via a clock pulse generator. Each read-only memory delivers program signals predetermined by its program that correspond to the output signals of the pulse counter and the outputs of all read-only memories are connected to the components they control via a program selector circuit. For a free program, a freely programmable memory is provided, whose content can be transmitted into an unprogrammed program module.

2 Claims, 2 Drawing Figures

X-RAY DIAGNOSTIC INSTALLATION FOR X-RAY PHOTOGRAPHS

BACKGROUND OF THE INVENTION

The invention relates to an x-ray diagnostic installation for x-ray photographs comprising a program control device for the photographic cycle which contains an electronic read-only memory for each photographic program whose input is connected to a resettable pulse counter which is relayable step-by-step via a clock pulse generator and which memory delivers program signals predetermined by its program that correspond to the output signals of the pulse counter, wherein the outputs of all read-only memories are connected to the components they control via a program selector, and wherein, additionally to the read-only memories, a freely programmable memory for a freely programmable photographic program is provided.

In an x-ray diagnostic installation of this type, the program storage ensues purely electronically. It is not necessary to read mechanical program memories, for example data cards, for the program reproduction. Operational dependability, therefore, is great. For program selection, keys can be provided in a simple way. On the basis of the electronic memories for the photographic programs it is possible to conduct a program trial run, wherein for example the values and magnitudes respectively predetermined by the program are optically indicated.

In the subject of a prior German application No. P 26 47 928.7, for program storage a read-only memory is provided for fixed programs on the one hand and a freely programmable memory is provided on the other hand. In the freely programmable memory, a photographic program can be read in that can be composed completely in accord with the wishes of the user.

In practical application, there is the desire to be able to permanently retain such a freely composed program, so that it is available as required. The freely programmable memory is not suited for this, for various free programs are read into it and upon the read in of a free program its contents are erased.

SUMMARY OF THE INVENTION

The object underlying the invention is to design an x-ray diagnostic installation of the type initially cited in such manner that there exists the possibility of fixedly programming a program from the freely programmable memory.

This object is inventively achieved in that change-over switching means are provided, by means of which the output of the freely programmable memory is connectable to a program module for the reception of the free program; and in that switching means are provided to cut in this program module in place of a read-only memory or of the freely programmable memory. In the inventive x-ray diagnostic installation, a plug-in device to receive the program module for programming and program reproduction can be present in an operating desk (or console) in which switching installations for program selection and programming are provided. For programming, the user takes an unprogrammed program module, plugs it into the operating desk, programs it, and can then use it for program control of the x-ray diagnostic installation as often as he wishes.

Further advantages and details of the invention derive from the subclaim.

The invention is explained in greater detail on the basis of a sample embodiment illustrated in the accompanying sheets of drawings; and other objects, features and advantages will be apparent from this detailed disclosure and from the appended claims.

DETAILED DESCRIPTION

Figure 1:
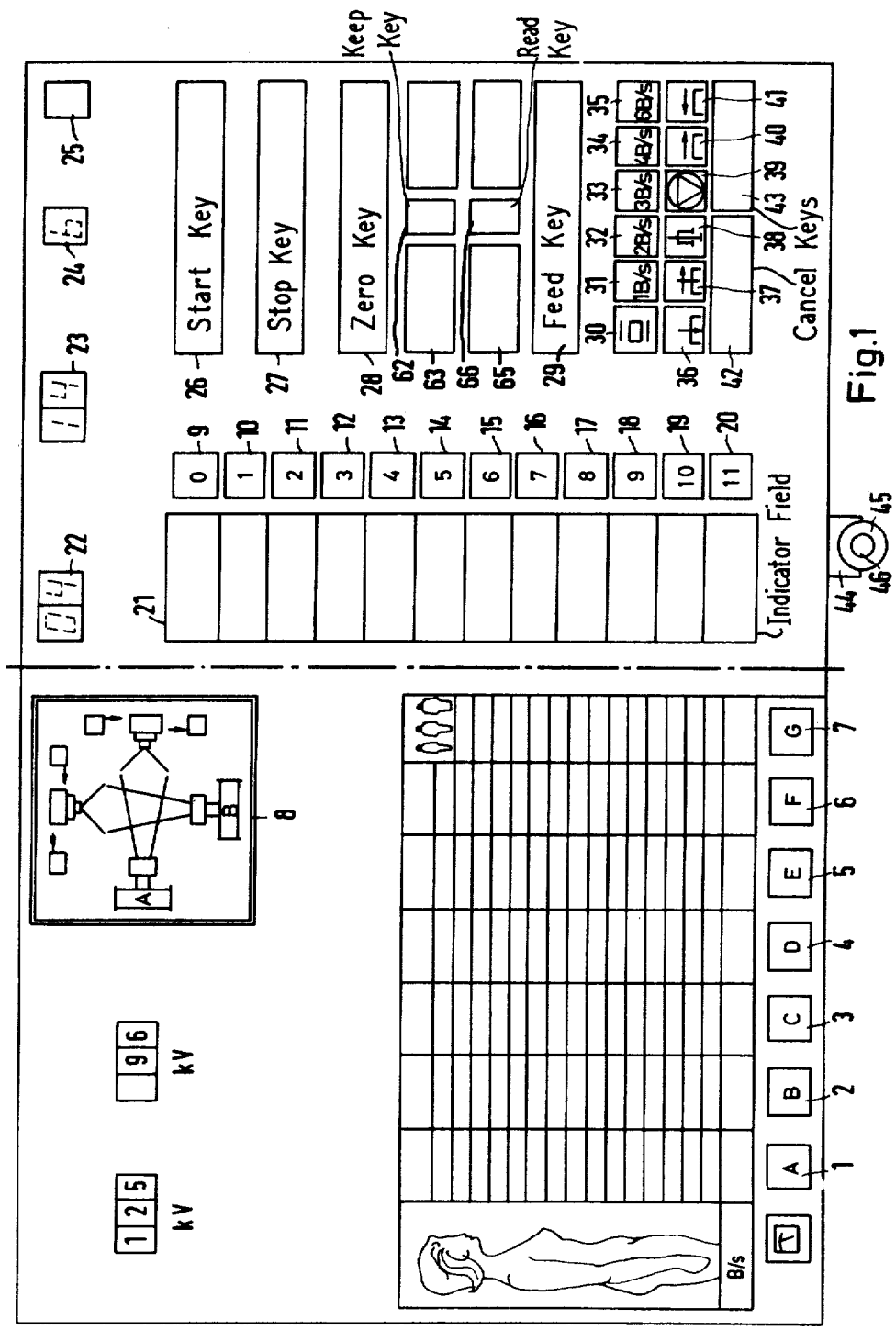
FIG. 1 is a view of the operating desk of an x-ray diagnostic installation in accord with the invention.

According to FIG. 1, the operating desk comprises, in that part illustrated to the left of the dot-dash line, a number of organ keys 1 through 7, which permit the selection of the photographic exposure values for a photograph or photographic series in an organ-programmed manner. In the example, the operating desk acts as an angiophotography installation for producing x-ray photographs in two planes in accord with the operational chart 8 with the help of two series film cameras. Further, it also comprises indicator installations for the x-ray tube voltage and further magnitudes.

In the right-hand part of the operating desk, according to FIG. 1, there are eleven program keys 9 through 20, to which an indicator field 21 is allocated, in which field the program allocated to each key is indicated. Further, an indicator field 22 for the program number, an indicator field 23 for the respective point in time present since program initiation, an indicator field 24 for the respective image frequency, and an indicator field 25 for the film supply are provided. A start key 26 and a stop key 27 are provided for program monitoring. For the selection of the program initiation, a zero key 28 is provided. A program is manually relayable by means of a feed key 29. Further, keys 30 through 41 with symbols for the selectable values and magnitudes are provided, said keys having two functions, namely the one being to indicate the respective value at the check-out of the selected program and the other being to freely program any (random) program when key 20 is depressed. The freely programmed program is completely cancellable by means of cancel key 42. In order to cancel the respectively last freely input value, a cancel key 43 is provided.

When key 9 is pressed, then no automatic program cycle of a photographic series ensues. In this case, the physician actuates one of the organ keys 1 through 7 and selects the other values manually, in a manner not illustrated. If one of the constant given photographic programs is chosen that are selectable by means of keys 10 through 19, then one of those keys is pressed. In the sample embodiment, key 4 (NB: key 4 is designated by number 13) is depressed and, accordingly, the number 4 appears in the indicator field 22. The constant given program assigned to key 4 can be checked out in that the start key 26 is actuated. In field 23, the elapsed time of the program is now indicated in seconds and keys 30 through 41 light up, corresponding to the respectively set values. For purposes of control, this automatic program cycle can be arrested by depressing key 27. Further, a return to the point of start of the program is possible by pressing key 28. In this case, the indication zero appears in the indicator field 23 and the program cycle can begin anew.

Should the program selected by means of one of the keys 10 through 19 now in fact cycle, then a start switch 45 is taken in hand from a support-mount device 44 where it is detachably mounted, and its button 46 actuated. The selected program now cycles automatically, i.e. first, for example, a contrast agent injection is automatically carried out (key 38 lights up), then a photograph series ensues spanning two seconds with an image frequency of two images per second (key 32 lights up), then a table displacement ensues, etc. The keys 30 through 41 then respectively light up.

When key 20 is actuated, then it is possible to input any random photographic program by means of the feed key 29. To this end, first the requisite values for the first program step (0–1 sec.) are input by means of the keys 30 through 41. Then the feed key 29 is actuated and the requisite values are again input for the second program step by means of keys 30 through 41, and so forth. In so doing, the cancel key 42 allows cancellation of the complete manually input program, whereas the cancel key 43 allows a cancellation of the last respective input program step.

Figure 2:
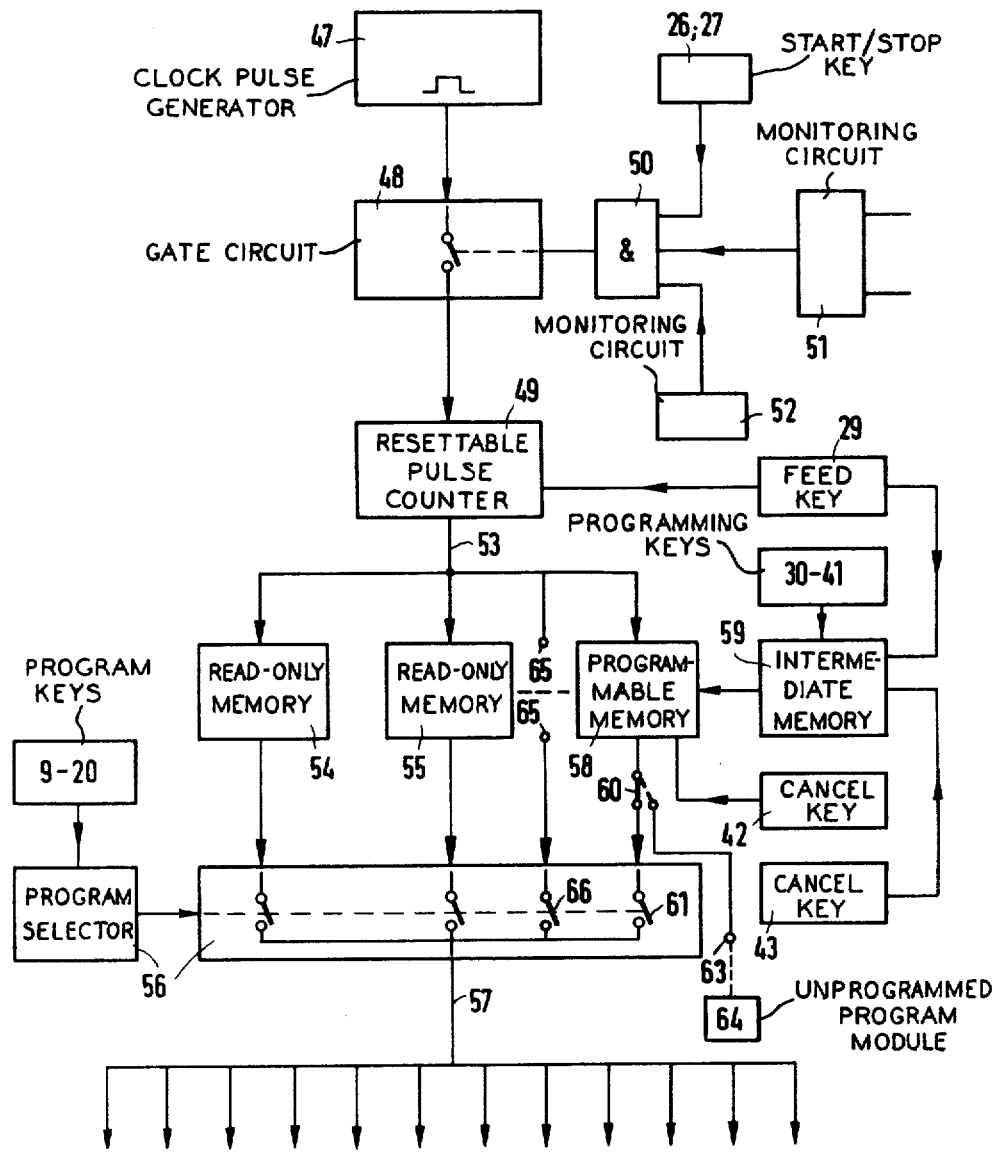
FIG. 2 shows a circuit diagram of an x-ray diagnostic installation in accord with the invention.

In FIG. 2, a clock pulse generator 47 is illustrated, which supplies an output impulse per second to a gate circuit 48. The output of the gate circuit 48 is connected to a resettable pulse counter 49. The gate circuit 48 is activated by an AND operation 50, at whose inputs the keys 26 and 27 as well as a film flow monitoring installation 51 and a monitoring installation for the collector cassette of the film camera 52 are connected. When the start key 26 is pressed, the requisite film flow is present and the collector cassette is empty, then the AND operation 50 closes the gate circuit 48 and the impulses of the clock pulse generator 47 are supplied to the resettable pulse counter 49, i.e., the photographic program begins. The stepping slide switch 49 delivers a signal at its output 53, which signal characterizes the respective step and is supplied in parallel to a plurality of read-only memories whose number is equal to the number of program keys; in the sample embodiment this corresponds to ten program keys. The output information of the resettable pulse counter 49, characterizing the respective step and hence the respective second, effects that all read-only memories 54, 55, etc., deliver signals at their outputs that fix the photograhic values corresponding to the respective time step, thus for example the image frequency of the film camera, the table position, the focus of the x-ray tube, etc. Via a program selector circuit 56, only one of the read-only memories 54, 55, etc., is respectively connected to the output 57 that leads to the components that are to be controlled. The program selector circuit 56 is connected to the program keys 9 through 20.

A freely programmable memory 58 is allocated to key 20 to which memory an intermediate memory 59 is pre-connected. The memory 58 can be cancelled by means of cancel key 42, whereas the intermediate memory 59 can be cancelled by means of cancel key 43. The feed key 29 is likewise connected to the intermediate memory 59 and the resettable pulse counter 49. Finally, the keys 30 through 41 are also connected to the intermediate memory 59.

For the free programming of the memory 58, the desired value combination is input in the intermediate memory 59 by means of the keys 30 through 41. When the feed key 29 is subsequently actuated, then the content of the intermediate memory 59 migrates into the memory 58 and this content is relayed one step via the resettable pulse counter 49. Subsequently, the next value combination assigned to the next program step can be input in the intermediate memory 59 by means of the keys 30 through 41. After actuation of the feed key 29, this value combination, too, migrates into the memory 58, etc. The entire content of the memory 58 can be cancelled by actuating the cancel key 42, whereas the last respective input value combination can be cancelled by actuating the cancel switch 43.

The freely programmable memory 58 is normally connected to the program selector circuit 56 via change-over switch 60, whereby the change-over switch 60 is in the position as drawn with an unbroken line. In this case, the program control of the x-ray diagnostic installation ensues upon closure of the switch 61 by means of the program stored in the freely programmable memory 58. If the physician wishes that this program be permanently kept, then he actuates a key 62 on the operating desk according to FIG. 1. Thereby the change-over switch 60 is switched over to its position as drawn with a dotted line and the output of the freely programmable memory 58 is connected to a plug-in device 63. When the physician has plugged an unprogrammed program module 64 into the plug-in device 63 in the operating desk before actuation of the key 62, then the content of the freely programmable memory 58 is transmitted into this program module as it is relayed step-by-step by means of the resettable pulse counter 49. In this manner, it is possible for the physician to consecutively program a plurality of unprogrammed program modules, in complete accord with his wishes.

To reproduce the program of a program module programmed in this manner, it (the program module) is plugged into a plug-in device 65, FIG. 2, in the operating desk according to FIG. 1 and a key 66 subsequently actuated. The program of the plugged-in program module can subsequently be interrogated by means of the resettable pulse counter 49 and utilized to control the x-ray diagnostic installation.

Within the framework of the invention, the programming of an unprogrammed program module can also proceed from a freely programmable memory which does not contain a full photograhic program but only the information of individual program steps that replace the corresponding information of a read-only memory. In the case, in addition to the content of the free programmable memory, which here represents a correction memory, the content of a read-only memory that supplements said content of the freely programmable memory is also transmitted into an unprogrammed program module.

Each read-only memory 54, 55 can be a so-called PROM, i.e., a Programmable Read Only Memory. The freely programmable memory 58 can be a so-called RAM (Random Access Memory). The unprogrammed program modules can consist of unprogrammed PROMs.

It will be apparent that many modifications and variations may be effected without departing from the scope of the novel concepts and teachings of the present invention.

I claim as my invention:

1. An x-ray diagnostic installation for making x-ray photographs, said installation comprising: x-ray diagnostic equipment for effecting each of a series of
   respective photographic operating sequences in accordance with respective x-ray photographic programs, said x-ray diagnostic equipment having components including an x-ray source, a table capable of displacement, and x-ray photographic means for taking x-ray photographs, said components being operable in different sequences in accordance with the respective x-ray photographic programs, program control means having a series of read-only memory circuits for storing the respective x-ray photographic programs, and having an address input for control of addressing of said memory circuits, a resettable pulse counter being connected with the address input for said read-only memory circuits for sequentially selecting the program steps of the respective memory circuits, a clock pulse generator connected with the pulse counter for supplying control signals thereto to cause the pulse counter to sequentially select the program steps of the respective read-only memory circuits, said read-only memory circuits having outputs for supplying program signals in accordance with the stored program steps that are selected by said pulse counter, a program selection circuit connected with the outputs of said read-only memory circuits and selectively controlling the connection of the respective outputs with the components of said x-ray diagnostic equipment, a freely programmable memory for storing a freely selected photographic program, having an address input controlled by said pulse counter for sequential selection of the program steps of the stored freely selected photographic program, and having a programmable memory output for selective connection with the components of said x-ray diagnostic equipment in place of said read-only memory circuits to control the same in accordance with the stored freely selected photographic program, a program module (64) having storage means with a storage input, and operable for the reception and storage of a freely selected photographic program from the freely programmable memory (58), change-over switch means (60) operable for selectively connecting said programmable memory output with said storage input for effecting the reception and storage of the program steps of the stored freely selected photographic program by said storage means of said program module (64), and switching means (66) in said program selection circuit (56) and selectively actuatable thereby for selectively cutting in said program module (64) after supply of a stored freely selected photographic program thereto from said freely programmable memory (58), said switching means (66) having means (56) connected therewith and providing for the connection of said storage means of said program module (64) with said components of said x-ray diagnostic equipment under the control of said switching means (66).

2. An installation according to claim 1, characterized in that an operating desk with switching installations for program selection and programming (FIG. 1) is provided, said operating desk having plug-in means (63, 65) for receiving said program module (64) for programming from said freely programmable memory under the control of said changeover switch means (60) and for control of said components of said x-ray diagnostic equipment via said switching means (66).

* * * * *